United States Patent
DeLuca

(10) Patent No.: US 8,542,204 B2
(45) Date of Patent: Sep. 24, 2013

(54) METHOD, SYSTEM, AND PROGRAM PRODUCT FOR NO-LOOK DIGIT ENTRY IN A MULTI-TOUCH DEVICE

(75) Inventor: Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/819,192

(22) Filed: Jun. 19, 2010

(65) Prior Publication Data

US 2011/0310027 A1 Dec. 22, 2011

(51) Int. Cl.
*G06F 3/041* (2006.01)

(52) U.S. Cl.
USPC .............. 345/173; 345/166; 345/156

(58) Field of Classification Search
None
See application file for complete search history.

(56) References Cited

U.S. PATENT DOCUMENTS

| | | | |
|---|---|---|---|
| 5,982,302 A | 11/1999 | Ure | |
| 2003/0048260 A1 | 3/2003 | Matusis | |
| 2006/0097991 A1 | 5/2006 | Hotelling et al. | |
| 2006/0125803 A1 | 6/2006 | Westerman et al. | |
| 2006/0197752 A1 | 9/2006 | Hurst et al. | |
| 2009/0027351 A1 | 1/2009 | Zhang et al. | |
| 2009/0219252 A1 | 9/2009 | Jarventie et al. | |
| 2009/0284480 A1 | 11/2009 | Seacat | |

FOREIGN PATENT DOCUMENTS

EP 1780625 5/2007

OTHER PUBLICATIONS

T. V. Raman, "Eyes-Free User Interaction", Feb. 9, 2009, Google Research, Stanford Feb. 2009.
Christian Metzger, Oct. 31, 2004, "FreeDigiter: A Contact-free Device for Gesture Control", Proceedings of the Eighth International Symposium on Wearable Computers, Oct. 31-Nov. 3, 2004, vol. 1, on pp. 18-21.

*Primary Examiner* — Muhammad N Edun
(74) *Attorney, Agent, or Firm* — Jordan IP Law, LLC

(57) ABSTRACT

A method, device, and program product are provided for no-look entry of digits in a multi-touch device. A multi-touch screen of the multi-touch device senses an initializing combination of at least one touch. A no-look digit entry application assigns a binary value to each touched location. The multi-touch screen detects at least one combination of at least one touch of the touch screen. The no-look digit entry application determines the locations touched and enters digit inputs corresponding to the sum of the binary values assigned to the locations for each detected combination of touches.

20 Claims, 5 Drawing Sheets

METHOD, SYSTEM, AND PROGRAM PRODUCT FOR NO-LOOK DIGIT ENTRY IN A MULTI-TOUCH DEVICE

FIELD OF THE INVENTION

The invention relates to the field of multi-touch sensors and more particularly to a method, system, and program product for entering digits in a multi-touch device without looking at the device.

BACKGROUND

Multi-touch devices are increasingly growing in popularity. Multi-touch devices have a multi-touch screen, which is a resistive or capacitive sensor that is capable of sensing touches at more than one location. Typically the multi-touch screen overlies a display. Many devices using multi-touch screens completely do away with traditional key pads which are replaced with an on-screen version of a key pad.

Traditional key pads have an indicator key that allows a user to determine the location of the keys. Typically the indicator for a telephone keypad, for example, is the five (5) key. The indicator is usually a raised area that a user can feel without looking. On-screen key pads make it difficult to place a call without looking at the screen, because it is impractical to form a physical indicator structure that can be felt onto a touch screen, and because a touch screen displays or hides a dynamic key pad based on interactions with a user.

SUMMARY

A method, device, and program product are provided for no-look entry of digits in a multi-touch device. According to an embodiment of the present invention, a multi-touch screen of the multi-touch device senses an initializing combination of touches at a plurality of locations. A no-look digit entry application assigns a binary value to each touched location according to a predetermined pattern. The multi-touch screen detects combinations of touches of the touch screen. The no-look digit entry application determines the locations touched and enters digit inputs corresponding to the binary values assigned to the locations for each detected combination of touches.

In one embodiment of the present invention, the locations touched are determined by creating target areas at the initializing locations and detecting touches of the target areas.

According to another embodiment of the present invention, the locations touched are determined by calculating the nearest initializing location to the detected touch.

According to an embodiment of the present invention, sensing an initializing combination of touches comprises sensing simultaneous touches at a predetermined number of locations. In one embodiment, the predetermined number of locations is four, the first binary value is one, the second binary value is two, the third binary value is four, and the fourth binary value is eight.

According to other embodiments, sensing an initializing combination of touches comprises sensing touches for a predetermined period of time or sensing that the plurality of locations are touched in a predetermined sequence.

According to another embodiment of the present invention at least one combination of at least one entered digit is entered as a letter.

According to another embodiment of the present invention at least one combination of at least one digit is entered as a function from the group: delete last digit, finish, and switch to text.

According to another embodiment of the present invention a non-visual feedback signal indicating the digit entered.

According to an embodiment of the present invention, a multi-touch device is configured for no-look entry of digits. The device comprises: a multi-touch screen; a processor operably connected with the multi-touch screen; and a memory operably connected with the processor. The memory has encoded thereon a no-look digit entry application executable by the processor to: sense an initializing combination of touches on a touch screen at a plurality of locations; assign a binary value to each touched location according to a predetermined pattern; detect combinations of touches of the touch screen; determine the locations touched; and enter digit inputs corresponding to the binary values assigned to the locations for each detected combination of touches.

According to another embodiment of the present invention a program product is provided, comprising a computer storage medium having encoded thereon a computer executable program of instructions. The program of instructions comprises: program instructions for sensing an initializing combination of touches on a touch screen at a plurality of locations; program instructions for assigning a binary value to each touched location according to a predetermined pattern; program instructions for detecting combinations of touches of the touch screen; program instructions for determining the locations touched; and program instructions for entering digit inputs corresponding to the binary values assigned to the locations for each detected combination of touches.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The present invention provides a method, apparatus and program product for no-look entry of digits on a multi-touch screen of a multi-touch device. According to an embodiment of the present invention, a user touches four fingers to the multi-touch screen to initialize or establish the areas corresponding to binary values for digit entry. A no-look digit entry application senses the locations on the touch screen contacted by the four fingers and creates target areas at those locations. Once the target areas are created and the binary values are assigned, the no-look digit entry application detects combinations of target areas, sums the binary values for the combinations of target areas, and enters the digit corresponding to the sum of the binary values.

Figure 1:
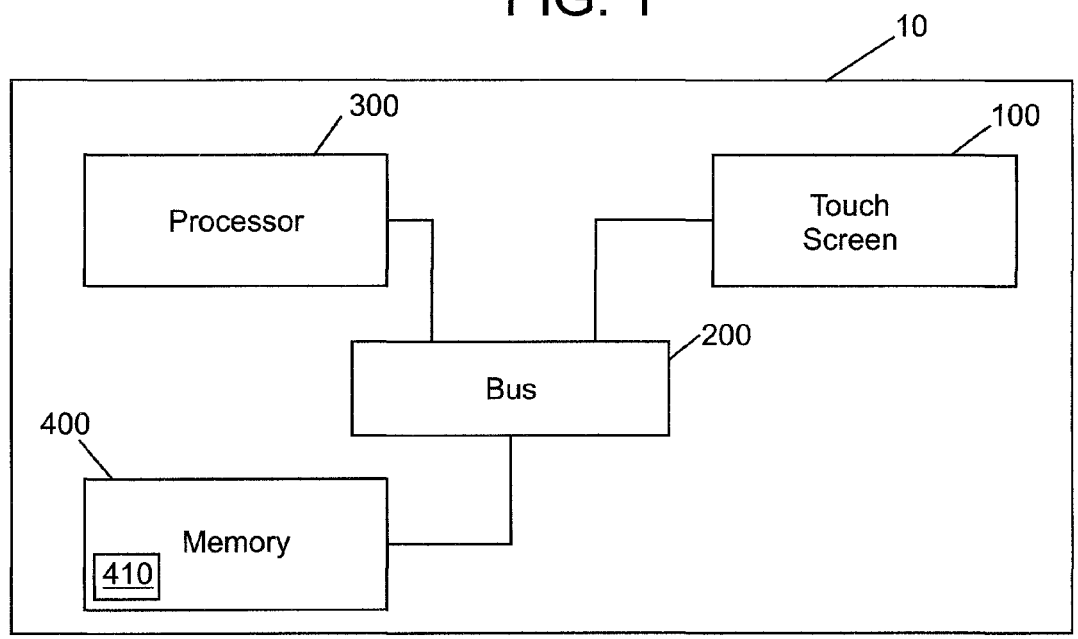
FIG. 1 is a block diagram of a multi-touch device configured for no-look entry of digits sensing locations for creation of target areas according to an embodiment of the present invention.

Referring now to FIG. 1, a block diagram of multi-touch device 10 for no-look entry of digits according to an embodiment of the present invention is shown. The multi-touch device has a multi-touch screen 100 for sensing or detecting contact therewith. The multi-touch screen 100 may be configured to sense or detect a touch by a finger tip, another body part, a stylus or other device for triggering a touch sensor, or any other object suitable for contacting a target area to trigger a touch sensor. Moreover, the multi-touch screen 100 can detect the location where a touch occurs and can detect multiple touches at the same time.

A processor 300 is operably connected with the touch screen 100 through a system bus 200 or other means for transmitting electronic signals. The processor may be any processing device or unit suitable for executing program code. According to one embodiment, processor 300 is one or more microprocessors.

A memory 400 is operably connected with the processor 300 through the bus 200. Memory 400 may comprise Random access Memory (RAM), persistent memory, such as a hard drive, a CD-ROM, a DVD drive, a USB memory device, or the like, or a combination thereof.

A no-look digit entry application 410 is encoded on the memory 400. The no-look digit entry application 410 is executable by the processor 300 to sense an initializing combination of touches on a touch screen at a plurality of locations, and assign a binary value to each initializing location according to a predetermined pattern. Then, after initializing, the no-look digit entry application 410 detects combinations of touches of the touch screen, determines the locations touched, and enters digit inputs corresponding to the binary values assigned to the locations for each detected combination of touches.

Figure 2:
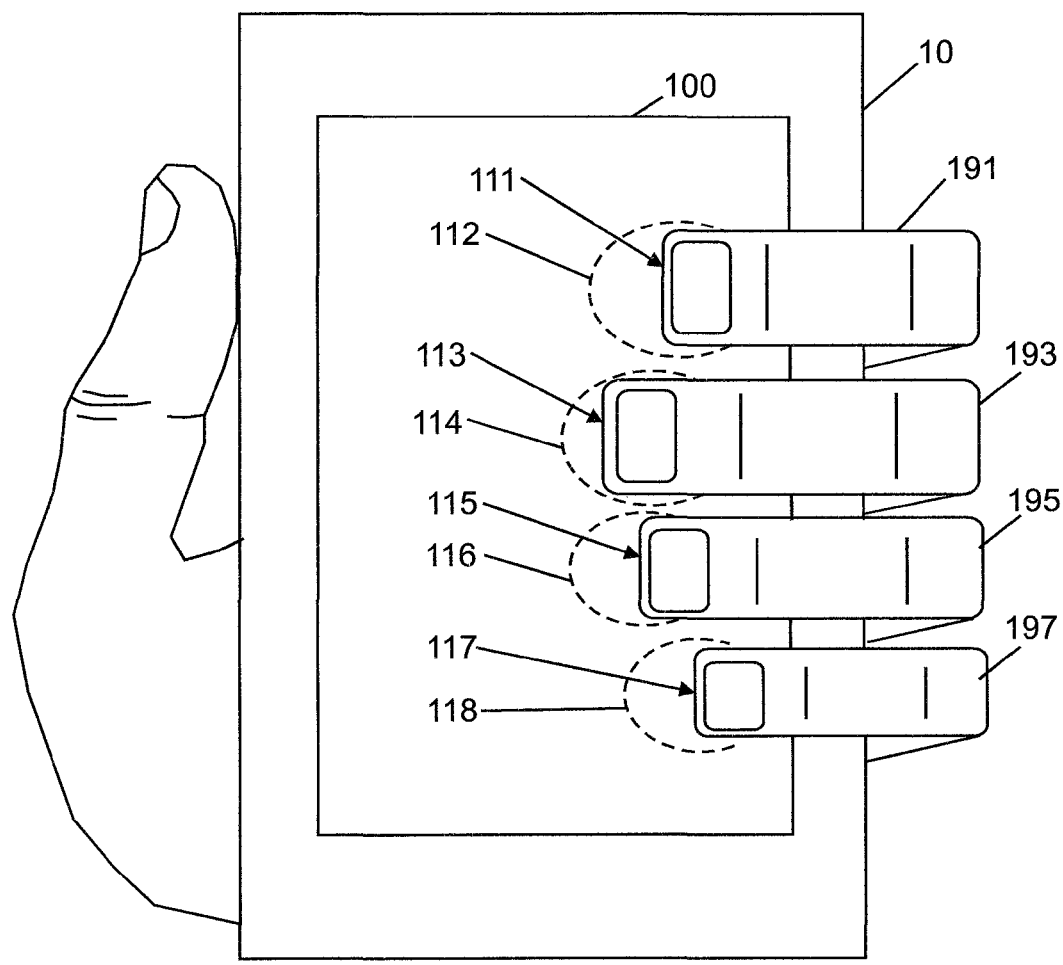
FIG. 2 is a front view of a multi-touch device configured for no-look entry of digits sensing locations for creation of target areas according to an embodiment of the present invention.
Figure 5:
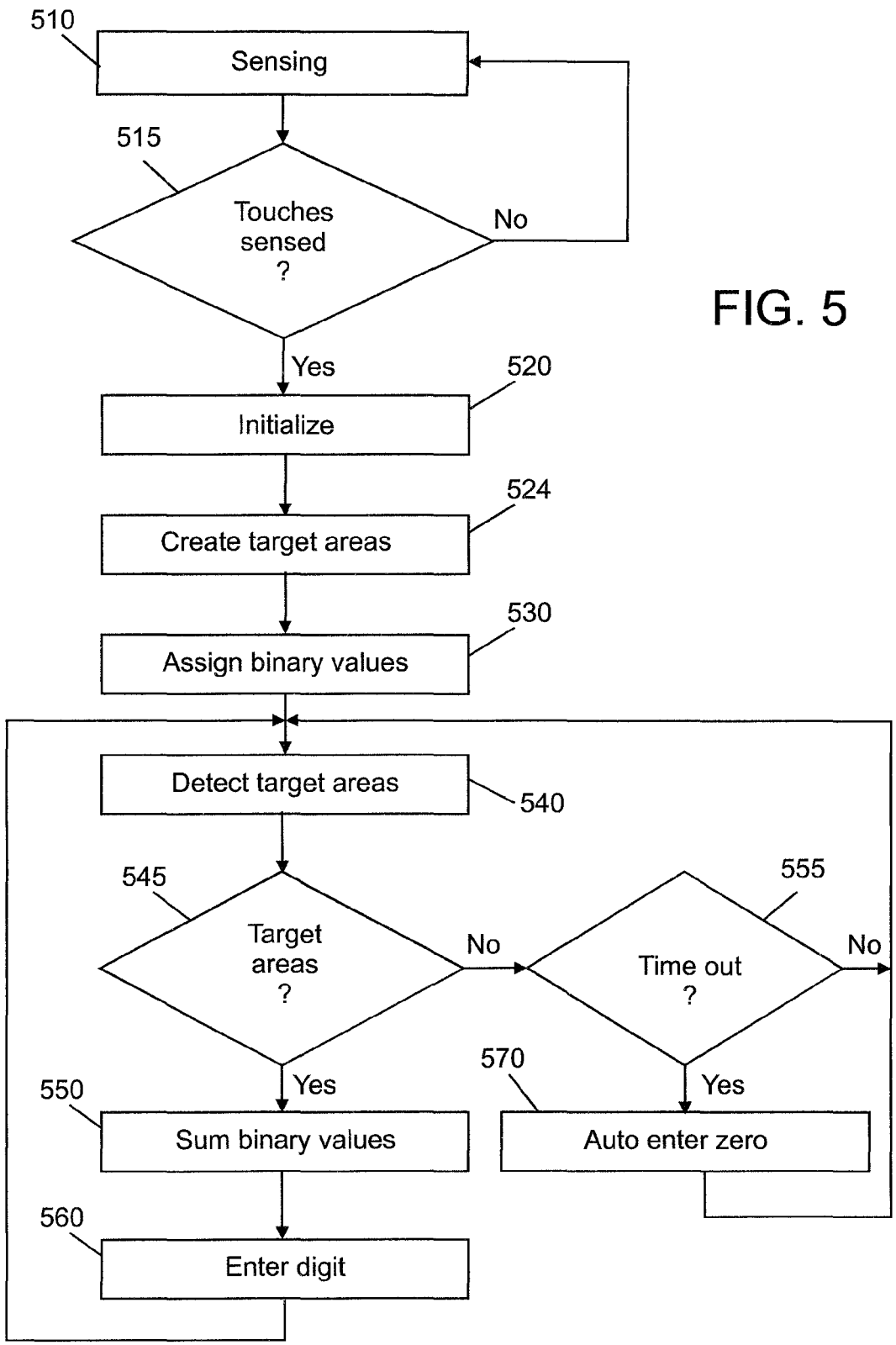
FIG. 5 is a flow diagram of a method for no-look entry of digits according to an embodiment of the present invention.

FIG. 5 is a flow diagram of a method for no-look entry of digits in a multi-touch device. The multi-touch screen 100 of the multi-touch device 10 senses for an initializing combination of touches (step 510). The initializing combination of touches comprises touches at a plurality of locations. In an embodiment of the present invention, the plurality of locations comprises four locations 111, 113, 115, 117, and the no-look digit entry application 410 initializes when four locations are simultaneously touched on the multi-touch screen 100. This initialization corresponds to a user touching the multi-touch screen 100 with four finger tips while holding the multi-touch device as shown in FIG. 2. According to an alternate embodiment, the no-look entry application 410 may initialize when four locations are touched sequentially.

The multi-touch screen 100 sends signals to the processor 300 responsive to the locations that the multi-touch screen 100 is touched. The no-look digit entry application compares these signals of touches from the multi-touch screen 100 with a pre-determined combination of initializing touches, such as simultaneous touches at four locations (step 515). The initializing touch combination may also comprise simultaneous or sequential touches essentially vertically or horizontally aligned on the multi-touch screen 100.

If the initializing combination of touches is not matched (no at 515), then the no-look digit entry application continues to monitor for the initializing combination of touches on the touch screen 100.

If the initializing combination of touches is matched (yes at 515), then, according to an embodiment of the present invention, the no-look digit entry application initializes the locations touched (step 520). Initializing means that the no-look digit entry application 110 stores the locations of the touches when the initializing touch combination is detected.

According to an embodiment of the present invention, as part of the initializing step, the no-look digit entry application 110 creates target areas 112, 114, 116, 118 at the locations touched (step 524). A target area is an area of a touch screen assigned a defined function or value when it is contacted. The target areas may be larger than the area contacted, provided that they do not overlap.

Figure 3:
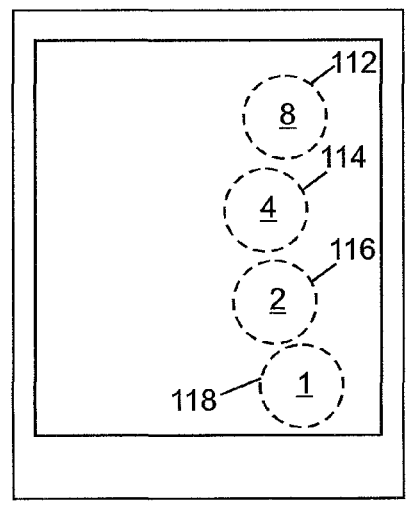
FIG. 3 is a front view of the multi-touch device of FIG. 1 with binary values assigned to the target areas according to an embodiment of the present invention.

As shown in FIG. 3, the target areas are assigned binary values (step 530). For the four finger example of FIG. 2: $2^0$ or 1 is assigned to a first target area 112; $2^1$ or 2 is assigned to a second target area 114, $2^2$ or 4 is assigned to a third target area 116, and $2^3$ or 8 is assigned to a fourth target area 118. The values are assigned according to a predetermined pattern, such as vertically sequential from the bottom, in which the lowest vertical target area is assigned the value of 1, the second target area is assigned the value of 2, the third target area is assigned the value of 4 and the top target area is assigned the value of 8. For example, the target area at the first or index finger 191 is assigned a value of 8, the target area at the second or middle finger 193 is assigned the value of 4, the target area at the third or ring finger 195 is assigned the value of 2, and the target area at the fourth or little finger 197 is assigned the value of 1.

Once the target areas 112, 114, 116, 118 are created and the binary values are assigned, the no-look digit entry application 110 monitors for combinations of target areas. That is, the multi-touch screen 100 senses the touches and sends signals to the processor 300 (step 540), and processor executes instructions of the no-look digit entry application 110 to monitor the signals from the multi-touch screen 100 to determine whether or not target areas have been touched and which target areas have been touched (step 545). If no touches are detected (no at step 545), then the no-look digit entry application 110 tests for a time out condition (step 555). If the time out condition is met, then optionally a zero may be automatically entered (step 570). If the time out condition is not met, then the no-look digit entry application 110 continues to monitor the signals from the multi-touch screen 100 to determine whether or not target areas have been touched and which target areas have been touched (step 545).

Figure 4:
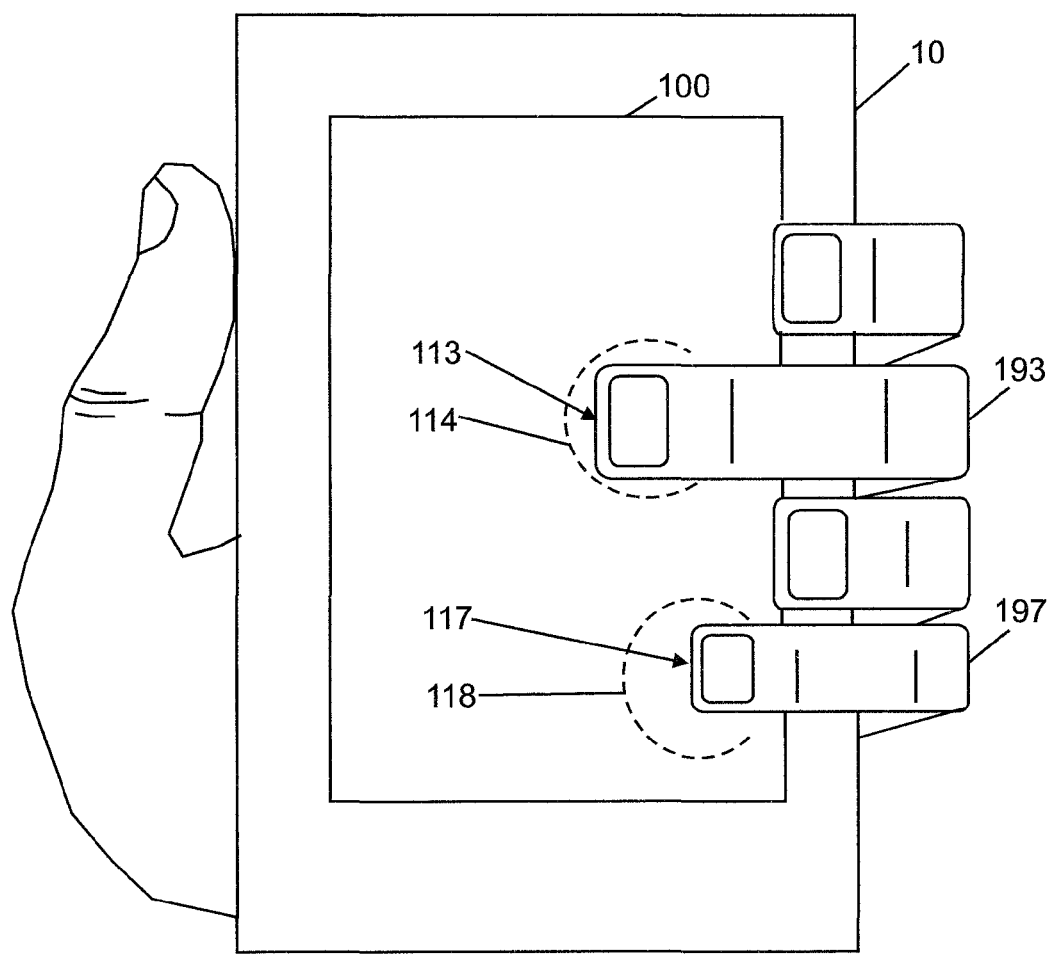
FIG. 4 is a front view of the multi-touch device of FIG. 1 with digits being entered according to an embodiment of the present invention.

If touches are detected (yes at step 545), then the processor 300 executing the no-look digit entry application 110 sums the binary values for the combination of target areas touched (step 550). For example, if the second and fourth fingers contact the touch screen, as shown in FIG. 4, then the binary value is 0101 which is the binary representation of the digit 5. One skilled in the art will appreciate that with four fingers, a user may make the binary representations for the digits 0 through 15 as shown in table 1.

TABLE 1

| Binary representation | Digit |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |

TABLE 1-continued

| Binary representation | Digit |
|---|---|
| 1011 | 11 |
| 1100 | 12 |
| 1101 | 13 |
| 1110 | 14 |
| 1111 | 15 |

As can readily be seen, the 1's correspond to fingers in contact with the multi-touch screen 110, an the 0's correspond to fingers not being in contact with the multi-touch screen 110. It should be understood that not all possible binary representations or finger combinations are necessary to represent the digits 0-9. Also, since the representation for zero is no touches, an embodiment of the present invention may substitute another representation such as 1010 (the binary representation of 10) for zero. The representations for 11-14 may also be assigned additional functions.

The no-look digit entry application may take each combination of touches that occur simultaneously as a digit, or pairs or tuples of simultaneous touches may be combined to form as digit enabling a user to represent all 26 letters of the alphabet for sending text messages. The grouping of touches may be a user selected option.

According to another embodiment, digits may be used to form letters using a predictive program. For example, T9 text may be entered as letters by predicting the word from the possible letter combinations. In T9 text, each digit may be any one of three or four possible letters. For example the digit 4 could be any one of the letters g, h, and i (the letters on the 4 key of a standard telephone keypad). The word "hello" may be entered in T9 text as follows:
0100 (4)=ghi
0011 (3)=def
0101 (5)=jkl
0101 (5)=jkl
0110 (6)=mno.
The word would be predicted as "hello" since that's the only word that can be formed from this combination of digits.

According to another embodiment digits may be combined into variable sized groups to form letters. The digits may be combined into groups of one, two, three, or more digits to create a letter or a function. Letters may be entered by a time out function. For example, in multi-tap texting on a telephone keypad an "a" is entered by a grouping of a single digit "2", "b" is entered by two digits "2", c is entered by a grouping of three digits "2", "d" is entered by a single digit "3", and so on. A time out function is used to enter a letter. The time out may occur if no touches are received for a period of time, such as three seconds. This period of time optionally may be user adjustable. The word hello may be sent by multi-tap text message by entering the following groups of touches:
0100 (4) 0100 (4)=h
0011 (3) 0011 (3)=e
0101 (5) 0101 (5) 0101 (5)=l
0101 (5) 0101 (5) 0101 (5)=l
0110 (6) 0110 (6) 0110 (6)=o.

After the binary values have been summed to determine a digit (step 550), the digit corresponding to the sum of the binary values is entered (step 560). Then, the no-look digit entry application monitors for another combination of touches (step 540).

According to an embodiment of the invention, the group of digits may represent a phone number. When the entire phone number has been entered, a user may invoke a dialing function. The dialing function may be a digit that is not used for phone numbers such as 1011 (11), for example.

According to another embodiment, the group of digit may represent a combination for unlocking a display of the multi-touch device 10, for example. The display may be unlocked upon entry of the last digit of the combination.

Figure 6:
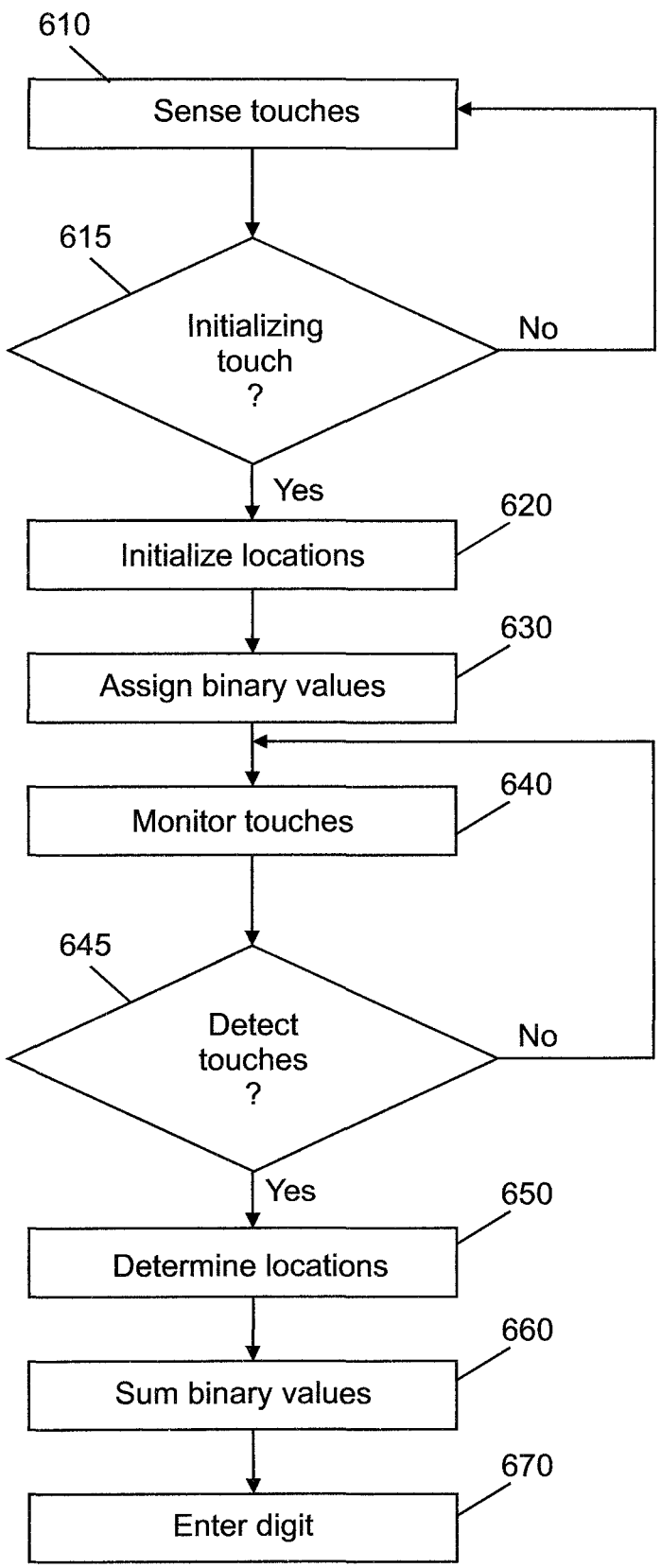
FIG. 6 is a flow diagram of a method for no-look entry of digits according to another embodiment of the present invention.

FIG. 6 is a flow diagram of a method for no-look entry of digits according to another embodiment of the present invention. In this embodiment, instead of creating target areas, the no look digit entry application, initializes the initializing locations by storing the locations that the multi-touch screen 110 is touched by the initializing combination of touches. The location of subsequently detected touches is determined by calculating the closest stored initializing location to each detected touch.

This method begins like the method of FIG. 5. When an initializing combination of touches is sensed (yes at step 615), the no look digit entry application 410, stores the locations that the multi-touch screen 110 is touched (step 620). The locations touched may be saved as a target point at the center of each touch. Binary values are assigned to the stored initializing or target locations (step 630), instead of target areas.

Then, when combinations of touches are detected (yes at step 645), the no-look digit entry application 410 determines the location of the touches by calculating the nearest stored initializing or target location to each detected touch (step 650). The no-look digit entry application 410 sums the binary values assigned to the closest initializing or target location for each detected touch (step 660). The digit corresponding to the sum of the assigned binary values is then entered (step 670).

According to one embodiment of the present invention, digits that are not used for entering data, such as numerals, may be used to call various functions. For example, 1100 (12) is not needed for entering numerals, as in base 10 only the numerals 0-9 are used. The digits that are not used for numerals may be used to call a function such as: delete last digit, finish, and switch from numerals to letters or text.

According to yet another embodiment of the present invention, the no-look digit entry application 410 may cause a non-visual feedback to be generated to confirm to the user the digit entered. For example, the multi-touch device may vibrate a number of times corresponding to the entered digit. In the example of FIG. 4, the digit 0101 (5) is entered, so the device would vibrate five times. Alternatively, the no-look digit entry application 410 may cause the device to emit a sound five times.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain or store the program for use by or in connection with the instruction execution system, apparatus, or device.

The foregoing method may be realized by a program product comprising a machine-readable medium having a machine-executable program of instructions, which when executed by a machine, such as a computer, performs the steps of the method. This program product may be stored on any of a variety of known machine-readable medium, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for no-look entry of digits in a multi-touch device, comprising:
    sensing an initializing combination of at least one touch on a touch screen;
    creating a target location at a location of each touch of the initializing combination, wherein each target location lacks a corresponding on-screen indicator;
    assigning a binary value to each target location;
    detecting at least one combination of at least one no-look touch of the touch screen;
    determining the target locations touched; and
    entering a predetermined digit input corresponding to the sum of binary values assigned to the target locations for each detected combination of no-look touches.

2. The method of claim 1, wherein the target locations are target areas creating at the initializing locations and determining the target locations touched comprises determining the target areas touched areas.

3. The method of claim 1, wherein the target locations are coordinates touched by the initializing touches and determined target locations touched comprises calculating the nearest target location to each detected touch.

4. The method of claim 1, wherein sensing an initializing combination of touches comprises sensing simultaneous touches at a predetermined number of locations.

5. The method of claim 4, wherein the predetermined number of locations is four, the first binary value is two to the power of zero ($2^0$), the second binary value is two to the power of one ($2^1$), the third binary value is two to the power of two ($2^2$), and the fourth binary value is two to the power of three ($2^3$).

6. The method of claim 1, wherein at least one combination of at least one entered digit is entered as a letter.

7. The method of claim 1, wherein at least one combination of at least one digit is entered as a function from the group: delete last digit, finish, and switch to text.

8. The method of claim 1, further comprising issuing a non-visual feedback signal indicating the digit entered.

9. The method of claim 1, wherein sensing an initializing combination of touches comprises sensing touches for a predetermined period of time.

10. The method of claim 1, wherein sensing an initializing combination of touches comprises sensing that the plurality of locations are touched in a predetermined sequence.

11. The method of claim 1, wherein binary values are assigned to the initializing touches according to a predetermined pattern based on the position of each touched location relative to each other.

12. The method of claim 1, wherein the predetermined digit input is to be used to execute one or more user operations.

13. A multi-touch device configured for no-look entry of digits, comprising:
    a multi-touch screen;
    a processor operably connected with the multi-touch screen; and
    a memory operably connected with the processor and having encoded thereon a no-look digit entry application executable by the processor to:
        sense an initializing combination of touches on a touch screen at a plurality of locations to create one or more target locations that lack a corresponding on-screen indicator;
        assign a binary value to each touched location according to a predetermined pattern;
        detect combinations of no-look touches of the touch screen;
        determine the locations touched; and
        enter predetermined digit inputs corresponding to the binary values assigned to the locations for each detected combination of no-look touches.

14. A program product, comprising a non-transitory computer readable storage medium having encoded thereon a computer executable program of instructions, comprising:
    program instructions for sensing an initializing combination of at least one touch on a touch screen to create one or more target locations that lack a corresponding on-screen indicator;
    program instructions for assigning a binary value to each touched location;
    program instructions for detecting at least one combination of at least one no-look touch of the touch screen;
    program instructions for determining the locations touched; and
    program instructions for entering predetermined digit inputs corresponding to the sum of the binary values assigned to the locations for each detected combination of no-look touches.

15. The program product of claim 14, further comprising:
    program instructions for creating target areas at the locations of the initializing touches; and
    wherein the program instructions for determining the locations touched determine the target areas are touched.

16. The program product of claim 14, wherein the program instructions for determining the locations touched determine the locations by calculating the nearest initializing location to the detected touch.

17. The program product of claim 14, wherein the program instructions for sensing an initializing combination of touches comprises sensing simultaneous touches at a predetermined number of locations.

18. The program product of claim 17, wherein the predetermined number of locations is four, the first binary value is two to the power of zero ($2^0$), the second binary value is two to the power of one ($2^1$), the third binary value is two to the power of two ($2^2$), and the fourth binary value is two to the power of three ($2^3$).

19. The program product of claim 14, wherein the program instructions for sensing an initializing combination of touches comprise sensing touches for a predetermined period of time.

20. The program product of claim 14, wherein the program instructions for sensing an initializing combination of touches comprise sensing that the plurality of locations are touched in a predetermined sequence.

* * * * *